May 12, 1942. W. LEATHERS 2,283,072
AUTOMATIC METER-READING APPARATUS
Filed Oct. 18, 1940
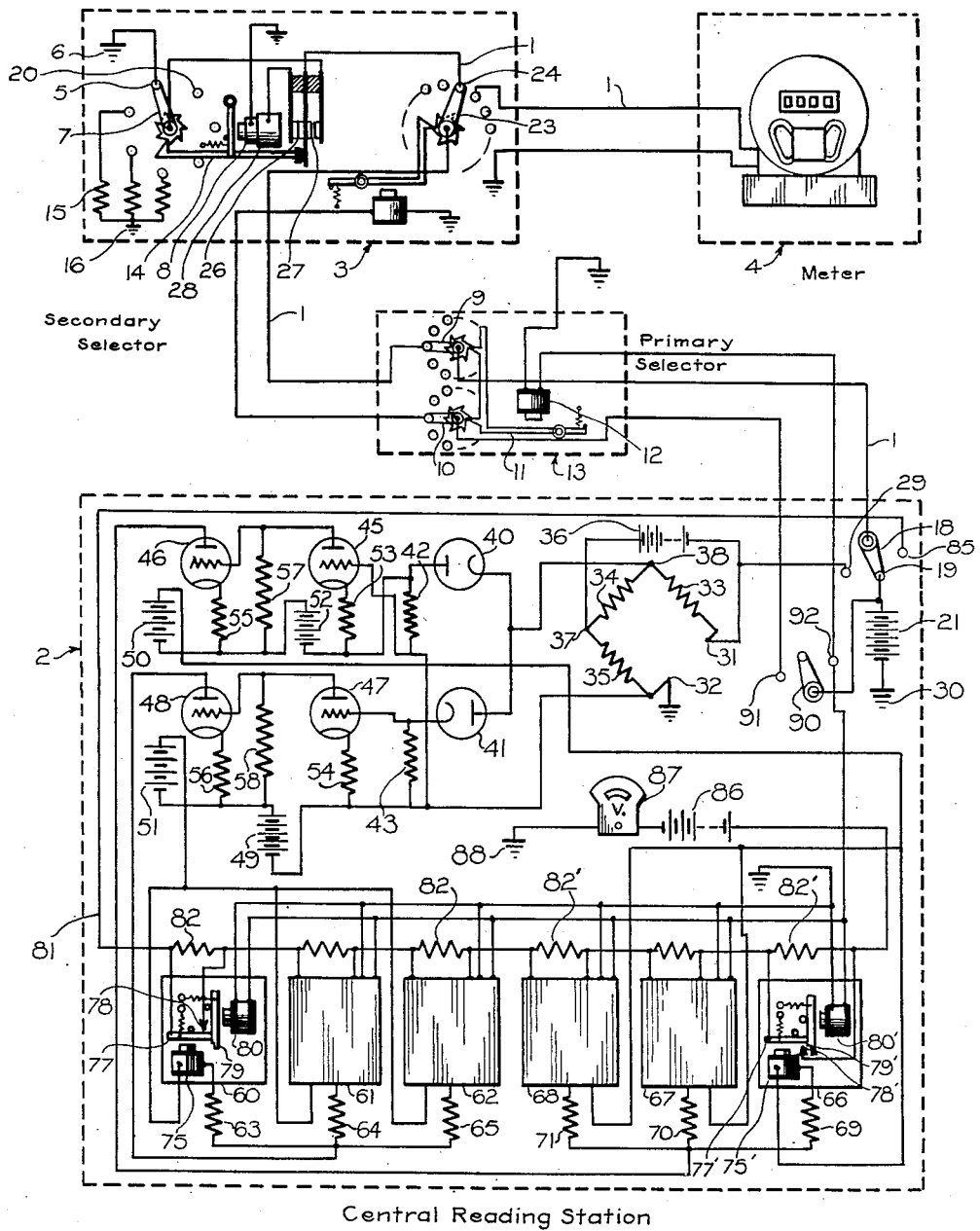
INVENTOR.
Ward Leathers Patented May 12, 1942

2,283,072

UNITED STATES PATENT OFFICE 2,283,072

AUTOMATIC METER-READING APPARATUS

Ward Leathers, Brooklyn, N. Y., assignor, by mesne assignments, to International Business Machines Corporation Application October 18, 1940, Serial No. 361,803

4 Claims. (Cl. 177—351)

The present invention relates to automatic electric control apparatus and circuits therefor and particularly to apparatus and circuits for automatically increasing or decreasing, as the case may be, the respective resistance values of a plurality of line circuits employed in a telemetric system to compensate for differences in such values as are occasioned by permanent factors such as line length and capacity and variable factors such as existing conditions of temperature and humidity, in order that the resistance value of each line circuit may be brought to a predetermined constant value immediately prior to effecting a telemetric reading of the usual constant meter-identifying resistances and/or of the usual variable meter-reading resistances.

The invention is applicable to telemetric systems of the type shown and described in my copending application, Serial No. 361,801 for meter-reading apparatus and wherein a plurality of meters are connected to a central station by a line circuit through outlying primary and secondary selector stations.

While the invention has been described specifically in connection with meter-reading apparatus of this type, the same is, with or without modification, applicable to other types of signaling systems wherein outdoor circuit lines of different lengths are employed for signaling purposes.

In a system for measuring resistance values established at remote points the total resistances of connecting wires to each resistor must be substantially the same if these values are to be accurately determined. The distances from the measuring point to the various resistors may vary greatly. The resistance of any line is proportional to its length and it fluctuates in accordance with conditions of temperature and humidity. Obviously, resistors located at the remote end of a line cannot be measured at the inner end of the line with apparatus that is calibrated for measuring resistors at the remote end of a similar line of different length without compensating for the difference in the lengths of the lines. It has been the usual practice to insert additional resistance in all lines, thus raising the total resistance of all lines to a predetermined standard, such as, for example, 1,000 ohms, the longer the line, the less the inserted resistance, the shorter the line, the more the inserted resistance. This solution does not, however, correct the changes in resistance due to temperature fluctuations or other causes. In order to compensate for all changes in resistance, a line requires the insertion of compensating resistance of the correct value at the moment of such use.

The present invention is designed to overcome the above noted limitations that are attendant upon the practice of introducing fixed resistances into circuit lines having variable resistance characteristics in a selector type of telemetering system and, toward this end, contemplates the provision of a control apparatus which is entirely automatic in its operation and which will automatically operate to determine the exact resistance value of each selected line circuit immediately upon selection thereof for reading purposes and to introduce into the selected circuit a series of one or more resistance increments, or to withdraw from such circuit a series of one or more such increments potentially existing in the circuit in order to bring the resistance value of the circuit to a predetermined constant.

Accordingly, it is broadly an object of the present invention to provide a telemetric system of such a character that the movements of a distant object, such as meter indicator or dial, may be correctly and accurately noted regardless of variable factors, as, for example, changes in temperature and humidity.

A still further object of the invention is to provide a control apparatus of this character for telemetric systems wherein variations in distance between an observing station and several transmitting stations will not militate against correct and accurate indications, so that an observing station may be placed in electrical communication with any number of transmitting stations, regardless of variations in distance between the observing station and the several transmitting stations without thereby destroying the accuracy or correctness of the indications.

Other objects and advantages of the invention will become readily apparent as the following description ensues.

In the accompanying drawing forming a part of this specification, the figure is a diagrammatic view of my improved apparatus.

Referring now specifically to the drawing wherein the invention is shown as being applied to a telelector system of the type disclosed in my above mentioned co-pending application for Letters Patent, only a line 1 from a central station 2 to a secondary selector 3 need be electrically compensate to a predetermined standard resistance value. The remainder of the circuit, from the secondary selector to a meter 4, does not vary enough to need balancing.

To measure the resistance of a line, such as 1, from a central reading station, generally characterized by the numeral 2, to a secondary selector generally characterized by the numeral 3, it may be shorted to ground at the secondary selector. This is accomplished by a contact 5 which is grounded at 6. An arm 7 connects the contact 5 to the line 1 when a relay 8 is energized. The relay 8 is energized in place of what would be the first meter, immediately after the secondary selector has been chosen, by two arms 9 and 10, advanced by a pawl 11 and an electro-magnet 12, in a primary selector generally characterized by the numeral 13. When the relay 8 is energized, the arm 7 is advanced by a pawl 14 to the next contact. A resistor 15 is wired from this contact to a ground 16. This resistor 15 is the first of three identifying resistors; the other two being wired to the next two contacts. They are read, one by one, at the central reading station in the same manner as a regular meter. Instead of then reading the accumulated consumption figures of a meter four blanks are recorded. The numerals indicated by the three resistors are the identifying number of the local selector rather than that of a meter. Every time the primary selector advances to select another secondary selector the resistance of line 1 leading thereto is corrected to a predetermined standard before the secondary selector is identified. The pulsing and reading function of the selectors is presently to be described.

Assuming that line 1 is about to be corrected for resistance, a switch 18 in the central reading station 2 is made to touch a contact 19 momentarily. The arm 7 in the secondary selector 3 is normally on a contact 20. It is, however, advanced to the contact 5 when the switch arm 18 touches the contact 19 and completes a circuit containing a battery 21. Current flows from the battery 21, through the contact 19, the switch arm 18, the line 1, the arm 9 in the primary selector 13, a continuation of the line 1, a switch arm 23, contacts 24 and 26, the relay 8, ground and thence back to the battery 21. The relay 8 is thus energized, advancing the arm 7 to contact 5, and closing the contact 27. Thus the line 1 is grounded at 6 in the secondary selector 3. A copper jacket 28 tends to delay the deenergizing of the relay 8 even after it stops receiving energy from the battery 21. The switch arm 18 is immediately thrown to a contact 29 which in effect places the line 1 across a gap between point 31 and ground 32. Three resistors, 33, 34, and 35, together with the line 1, now constitute a resistance-balance or bridge circuit. A battery 36 supplies current to this balance-circuit across the point 31 and a point 37. Resistors 33, 34 and 35 are each exactly equal to the predetermined standard for line 1 resistance. The standard resistance value of the line 1 is more than the greatest possible true resistance of line 1 not including resistors 82' which are used for ballast when the resistance of the line 1 is too high. When line 1 is equal to a standard resistance, for example 1,000 ohms, the potentials produced by battery 36 across each of the resistors 33, 34, 35 and the line 1 are equal. The potential between points 38 and 32 is, therefore, zero. When the resistance of line 1 is greater than 1,000 ohms, there is a potential difference between points 38 and 32. When the resistance of line 1 is less than 1,000 ohms there is a potential of opposite polarity across points 38 and 32. This potential is applied to two vacuum tubes 40 and 41. These tubes are diodes and are arranged so that the plate of tube 41 and the cathode of tube 40 are electrically connected to point 38. The cathode of tube 41 is connected to point 32 through a resistor 43 and the plate of tube 40 is connected to point 32 through a resistor 42. Thus current will flow through one of the diodes when there is a potential developed across points 38 and 32. The polarity of the potential determines which diode will pass current. Tube 41 will pass current when point 38 is positive and tube 40 will pass current when point 38 is negative. The amount of current passed through either of the diodes is dependent upon the potential difference regardless of polarity. Current that flows through diode 40 develops a voltage across the resistor 42. This voltage is applied to the grid of a triode vacuum tube 45. The tube 45 amplifies the voltage and applies it to a triode vacuum tube 46 which amplifies it further. The current that flows through tube 41 develops a voltage across the resistor 43. This voltage is applied to the grid of a triode vacuum tube 47. The tube 47 amplifies the voltage and applies it to a vacuum tube 48 which amplifies it further. A battery 49 supplies plate energy for tube 47; a battery 52 supplies energy to tube 45; a battery 50 supplies energy to tube 46; and a battery 51 supplies energy to tube 48. Resistors 53, 54, 55 and 56 provide grid bias for tubes 45, 47, 46 and 48 respectively. Resistors 57 and 58 are the plate load resistors of tubes 45 and 47 respectively.

The output of tube 48 is applied to a bank of locking relay circuits 60, 61 and 62 through resistors 63, 64 and 65 respectively. The output of tube 46 is applied to a bank of locking relays 66, 67 and 68 through resistors 69, 70 and 71 respectively. The resistors 63, 64 and 65 are respectively equal to resistors 69, 70 and 71. Resistors 65 and 71 are of higher resistance value than resistors 64 and 70; resistors 64 and 70 are of higher value than resistors 63 and 69. Each of these resistors is connected to a relay 75 or 75' in its respective circuit. Therefore, because of the higher resistor in series with it, the relay 75 in circuit 62 in order to actuate requires greater output of tube 48 than do the relays in circuits 60 and 61. The relay 75' in circuit 68 requires the same amount of output from tube 46 to actuate. When a relay circuit 60, 61 or 62 is actuated, an armature 77 is attracted to the relay 75 thus opening a normally closed contact 78. The armature 77 is locked in the attracted position by an armature 79 on a relay 80. The relay 80 must be energized, thus attracting the armature 79 before the armature 77 may be released. The relays in circuits 66, 67 and 68 operate in the same manner and at exactly the same inputs except that they operate on the output from tube 46. The contact 79' in these circuits is normally open and is closed when the armature 77' is attracted by the relay 75'. When the armatures 77 are in their normal positions the circuits 60, 61 and 62 each short a resistor 82 in a circuit 81. When contacts 78 are opened by the action of armature 77, the resistors 82 are unshorted and have effect in the circuit 81. Through various outputs of tube 48, one or more or none of the resistors 82 may be made effective in circuit 81. When the contacts 78' are in their normal position resistors 82' are effective in circuit 81. If any one of the armatures 77' is attracted to a relay 75' the corresponding resistor 82' is made ineffective to circuit 81 by shorting. One or more or none of the resistors 82' may be made ineffective in circuit 81 depending on the output of tube 46. In the normal positions of all armatures only the resistors 82' are in the circuit.

Thus, then when line 1 has less than the desired resistance of 1,000 ohms, the voltage between points 38 and 32 causes current to flow through diode 41 because points 38 becomes positive with respect to point 32. This current is amplified by tubes 47 and 48 and actuates one or more of the relays 75 in circuits 60, 61 and 62. The lower the resistance of line 1, the greater the voltage at point 38 and therefore the greater number of relays operated. As explained before, each actuated relay adds a resistor 82 to the circuit 81 which is a continuation of line 1. The addition of resistor or resistors 82 compensates for the low resistance of line 1. If, however, line 1 has more than 1,000 ohms resistance, point 38 becomes negative with respect to point 32, and current flows through diode 40 and is amplified by tubes 45 and 46. The output of tube 46 then actuates one or more of the relays 75' in circuits 66, 67 and 68, thus decreasing the resistance in line 1 by shorting one or more of resistors 82'. The reduction of resistance by the shorting of resistor or resistors 82' compensates for the excess resistance in line 1.

Although only three circuits for decreasing the resistance and three circuits for increasing the resistance of line 1 are shown in the drawing, in practice many more than three would be used for each function. The reason for this is that finer, more exact compensation may be obtained by adding or taking away smaller resistors (82 or 82'). Once the line 1 is compensated it will retain the same resistance of approximately 1,000 ohms until the secondary selector is changed by advancing the primary selector. Each time a new secondary selector is used, the line must again be compensated because of the difference in length and temperature between the new line and the old line. Therefore, the relays 80 and 80' are wired in parallel to the primary selector. Thus they are energized whenever the primary selector is advanced. The relays 80, when energized, attract the armature 79 and 79' thus releasing armatures 77 or 77' and restoring the circuit 81 to its original resistance value.

Immediately after the line 1 is balanced, the identifying number of the secondary selector is obtained by first pulsing the phaser 8 in the selector 3 by touching switch arm 18 to contact 19. The operator moves arm 18 to a contact 85. A circuit is thus established from ground, through one of the resistors 15 in the secondary selector 3, the switch arm 7, the contact 27, the contact 24 and arm 23, line 1, arm 9 in the primary selector 13, line 1, switch arm 18, contact 85, circuit 81, some, all or none of the resistors 82 and 82', a battery 86, an indicating device such as voltmeter or ammeter 87, and a ground 88. The resistor 15, the battery 86, and the constant 1,000 ohms of line 1 and circuit 81 cause the meter 87 to give a certain indication. Since the battery 86 and the line 1 have constant values the indication of the meter 87 is determined by the values of the resistor 15. Resistor 15 may be any one of ten values, each of the ten values representing a digit from 0 to 9. Thus we have read the first numeral. This same process is repeated for reading the next two numerals of the identifying number. Then the arm 7 is advanced to the contact 28 by pulsing, thus returning the selector to the original or home position. Now the first meter connected to the selectors is contacted by advancing arm 23. This is done by touching arm 90 to contact 91 for an instant. When all of the meters on the secondary selector 3 have been read, the arms 9 and 10 on the primary selector 13 are advanced to the next secondary selector by means of the electro-magnet 12. The magnet 12 is energized by touching the switch arm 90 to a contact 92 for an instant. All of the pulsing is accomplished by utilizing the battery 21.

What is claimed is:

1. In a telemetric system for measuring resistances over a line circuit, apparatus for automatically balancing the resistance of the line circuit to bring the same to a predetermined value comprising a bridge circuit having a plurality of resistance sides of predetermined values, a switch for connecting the line circuit as another side of said bridge circuit, a current source for establishing a potential differential between one pair of bridge side junctions, electronic means connected to said pair of bridge side junctions for amplifying the potential differential thereacross when the latter is of one polarity, additional electronic means connected to said pair of junctions for amplifying the potential differential thereacross when the latter is of the opposite polarity, a line balancing circuit, a series of balancing resistances therefor, a relay for each balancing resistance, means responsive to the operation of one group of relays for connecting their respective resistances in the balancing circuit, means responsive to another group thereof for shunting their respective resistances from the balancing circuit, and means connecting the relays of each group to the output circuits of the electronic means respectively.

2. In a telemetric system for measuring resistances over a line circuit, apparatus for automatically balancing the resistance of the line circuit to bring the same to a predetermined value comprising a bridge circuit having plural resistance sides of predetermined values, a switch for connecting the line circuit as another side of said bridge circuit, a current source for establishing a potential differential between one pair of bridge side junctions, electronic means connected to said pair of bridge side junctions for amplifying the potential differential thereacross when the latter is of one polarity, additional electronic means connected to said pair of junctions for amplifying the potential differential thereacross when the latter is of the opposite polarity, a line balancing circuit, a series of balancing resistances therefor, a relay for each balancing resistance, means responsive to the operation of one group of relays for connecting their respective resistances in the balancing circuit, means responsive to another group thereof for shunting their respective resistances from the balancing circuit, means connecting the relays of each group to the output circuits of the electronic means respectively, and means marginally adjusting the relays of each group to operate on output current of varying voltages from the electronic means.

3. In a telemetric system for measuring resistances over a line circuit, apparatus for automatically balancing the resistance of the line circuit to bring the same to a predetermined value comprising a bridge circuit having three resistance sides of a value equal to the predetermined value, a switch for connecting the line circuit as a fourth side of said bridge circuit, a current source for establishing a potential differential between one pair of bridge side junctions, electronic means connected to said pair of bridge side junctions for amplifying the potential differential thereacross when the latter is of one polarity, additional electronic means connected to said pair of junctions for amplifying the potential differential thereacross when the the latter is of the opposite polarity, a line balancing circuit, a series of balancing resistances therefor, a relay for each balancing resistance, means responsive to the operation of one group of relays for connecting their respective resistances in the balancing circuit, means responsive to another group thereof for shunting their respective resistances from the balancing circuit, means connecting the relays of each group to the output circuits of the electronic means respectively, means for locking the relays of each group in their operative positions, and means including said switch for thereafter connecting the balancing circuit to the line circuit and for disconnecting the bridge circuit from the line circuit.

4. In a telemetric system for measuring resistances over a line circuit, apparatus for automatically balancing the resistance of the line circuit to bring the same to a predetermined value comprising a bridge circuit having plural resistance sides of predetermined values, a switch for connecting the line circuit as another side of said bridge circuit, a current source for establishing a potential differential between one pair of bridge side junctions, electronic means connected to said pair of bridge side junctions for amplifying the potential differential thereacross when the latter is of one polarity, additional electronic means connected to said pair of junctions for amplifying the potential differential thereacross when the latter is of the opposite polarity, a line balancing circuit, a series of balancing resistances therefor, a relay for each balancing resistance, means responsive to the operation of one group of relays for connecting their respective resistances in the balancing circuit, means responsive to another group thereof for shunting their respective resistances from the balancing circuit, means connecting the relays of each group to the output circuits of the electronic means respectively, means marginally adjusting the relays of each group to operate on output current of varying voltages from the electronic means, means for locking the relays of each group in their operative positions, and means including said switch for thereafter connecting the balancing circuit to the line circuit and for disconnecting the bridge circuit from the line circuit.

WARD LEATHERS.